April 27, 1948.   L. OSWALD   2,440,642
LAND LEVELER
Filed July 10, 1944   4 Sheets-Sheet 1

Inventor
LOUIS OSWALD,
By Clarence A. O'Brien
and Harvey B. Jacobson
Attorneys

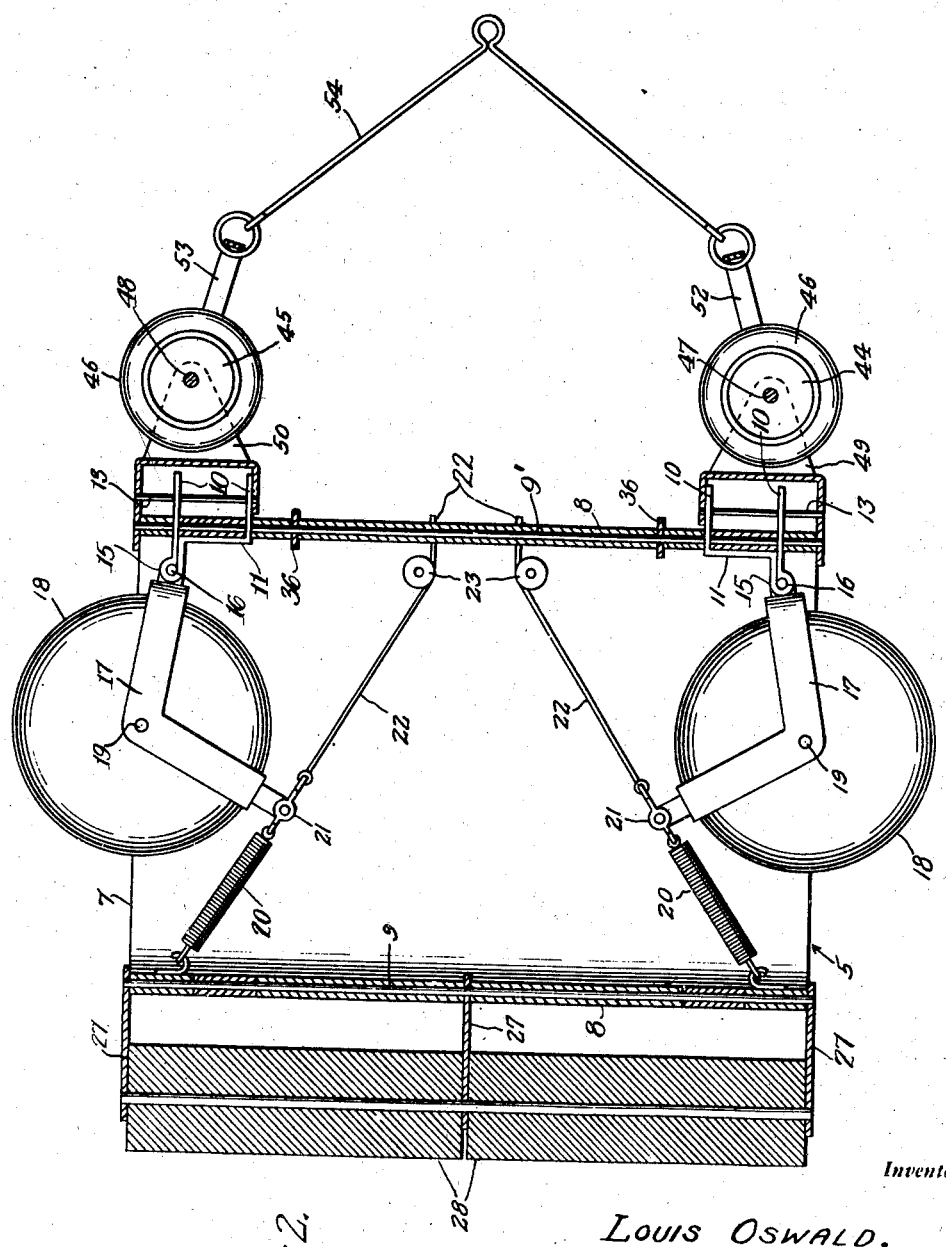

April 27, 1948.　　　　　L. OSWALD　　　　　2,440,642
LAND LEVELER
Filed July 10, 1944　　　　　4 Sheets-Sheet 3
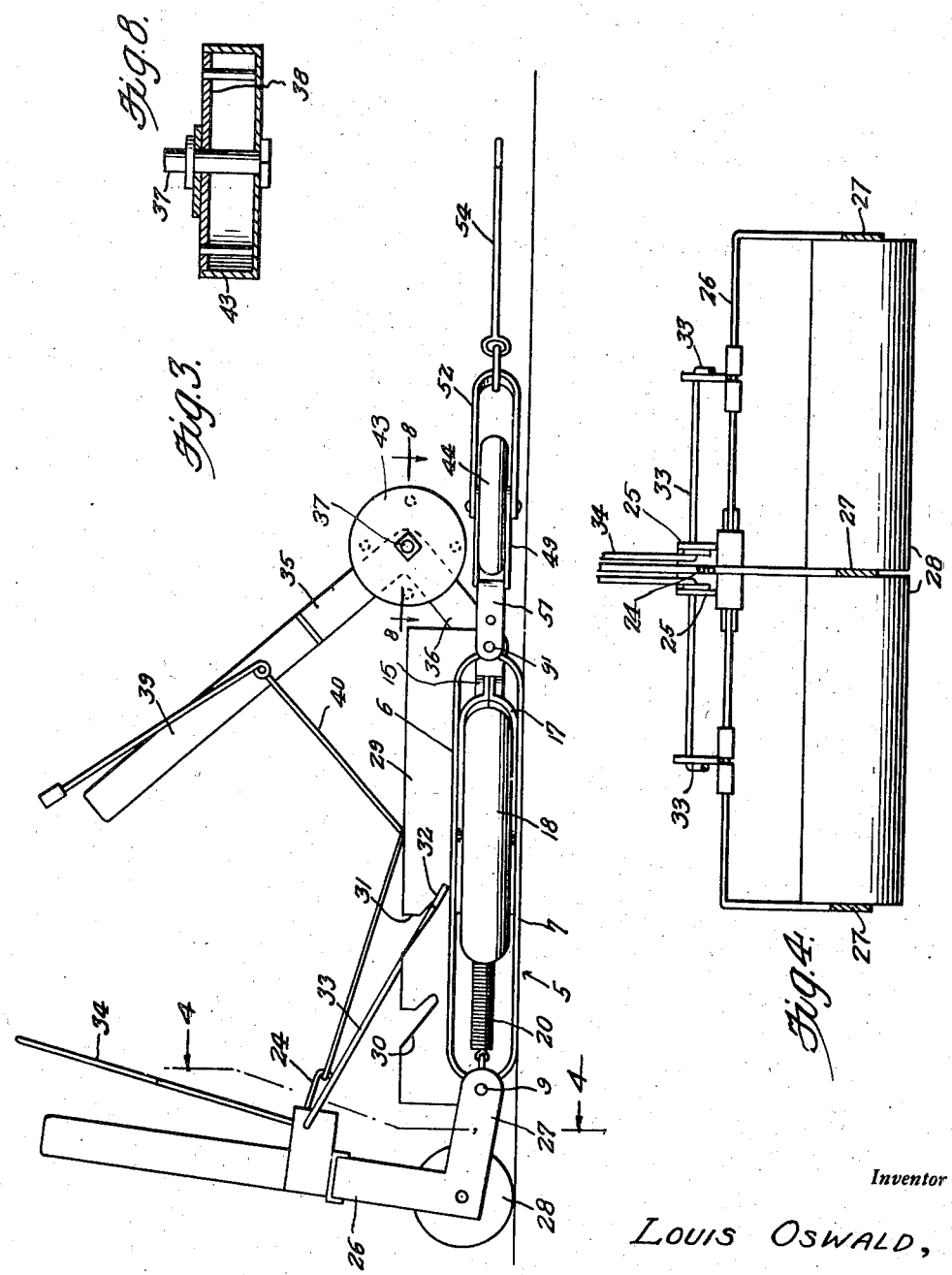
Inventor
LOUIS OSWALD,
By Clarence A. O'Brien
and Harvey B. Jacobson
Attorneys

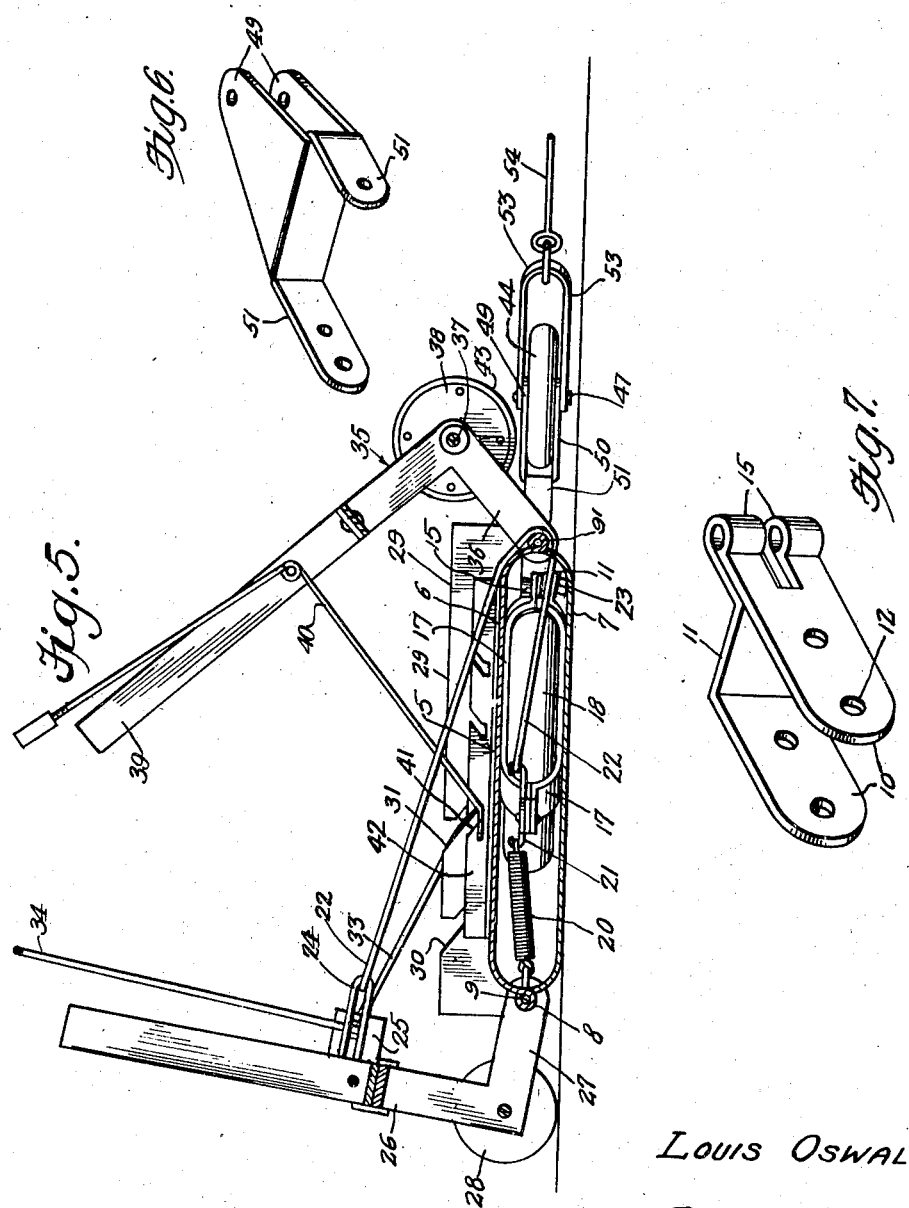

Patented Apr. 27, 1948

2,440,642

UNITED STATES PATENT OFFICE 2,440,642

LAND LEVELER

Louis Oswald, Los Angeles, Calif.

Application July 10, 1944, Serial No. 544,312
In Canada September 10, 1943

8 Claims. (Cl. 55—12)

The present invention relates to new and useful improvements in farm implements and has for its primary object to provide a sled-type device adapted to be hooked to a tractor and dragged over the ground after the same has been plowed and harrowed for the purpose of leveling and smoothing the surface of same by breaking up and crushing clods therefrom. The machine is adapted primarily for use in orchards and vineyards prior to the harvesting of the crop in order to provide a smooth walking surface for the gatherers of the crop.

A further important object of the invention is to provide a land levelling drag adapted to be drawn over the surface of the soil and embodying yieldable means at each end of the drag body which is properly cooperable therewith in such a way as to smooth and level the soil immediately adjacent the trees or vines of the vineyard.

A still further object is to provide a device of character stated which is of simple and practical construction, which is efficient and reliable in performance, relatively inexpensive to manufacture, and otherwise well adapted for the purposes for which the same is intended to serve.

Other objects and advantages reside in the details of construction and operation as more fully hereinafter described and claimed, reference being had to the accompanying drawings forming part hereof, wherein like numerals refer to like parts throughout, and in which:

Figure 2 is a centrally cut horizontal sectional view.

Figure 3 is a side elevational view of the structure illustrated in Figure 1.

Figure 4 is a view of the rear truck means taken substantially on line 4—4 of Figure 3.

Figure 5 is a longitudinal vertical sectional view taken approximately on the line 5—5 of Figure 1.

Figure 6 is a perspective view of the mounting for one of the advance buffer guide disks.

Figure 7 is a similar view of a hanger bracket for one of the end guide, levelling and buffer disks.

Figure 8 is a sectional view taken on a line 8—8 of Figure 3.

Figure 1:
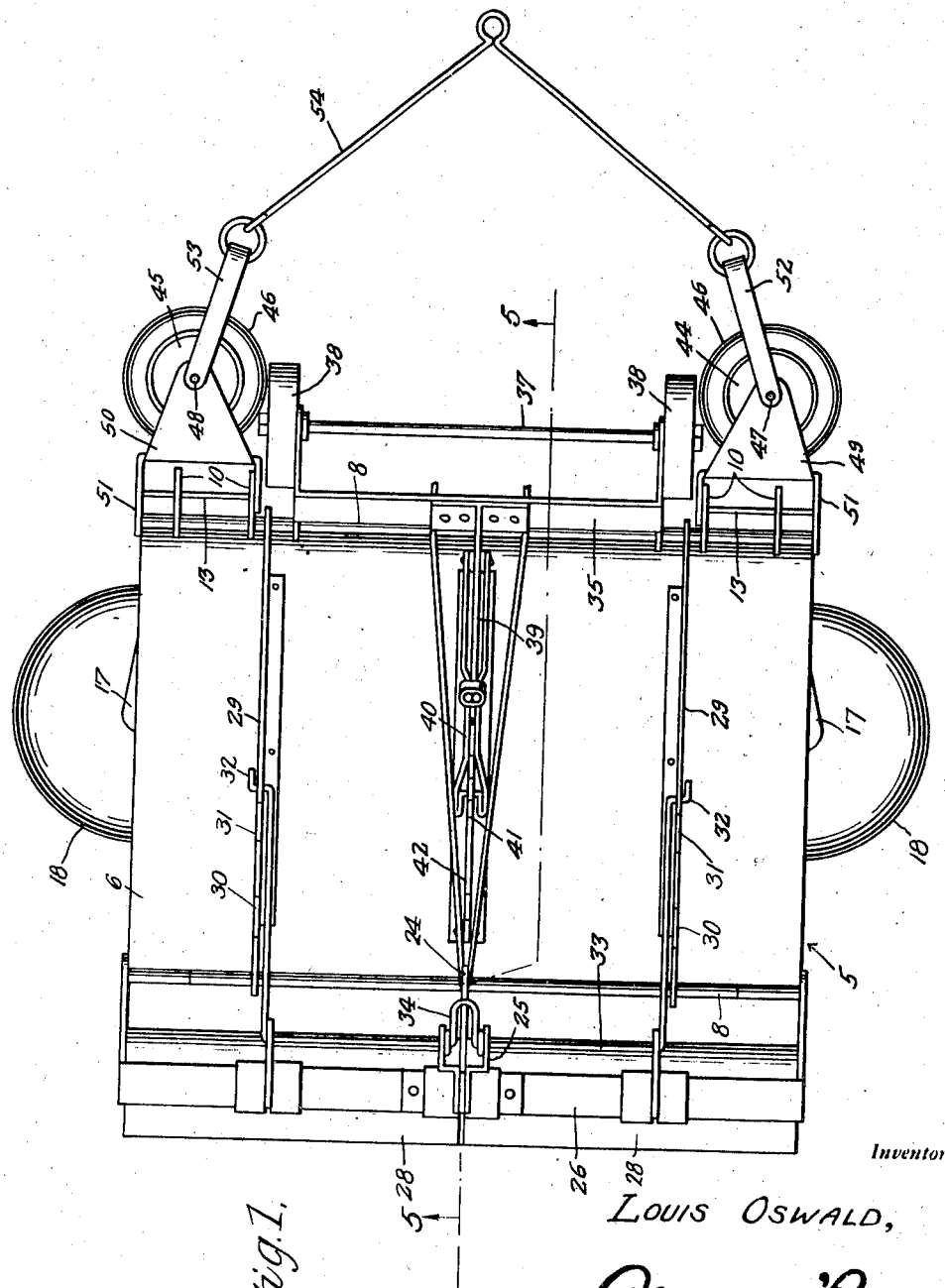
Figure 1 is a top plan view.

Referring now to the figures of the drawings in detail, wherein for the purpose of illustration I have disclosed a preferred embodiment of the invention, the numeral 5 designates the drag body or leveler generally, this being preferably in the form of a flattened hollow housing of suitable material and weight open at each transverse end and constructed of substantially flat upper and lower plates or sections 6 and 7, respectively. Said drag body is elongated, rectangular in plan and substantially oval in cross-sectional form, as shown more clearly in Figure 1 and Figure 3 of the drawings.

The leading front and trailing rear edges of the sections 6 and 7 are rolled as shown at 8 to provide assembling knuckles in which pins 9 and 9' are inserted and fitted for separably securing said sections together. For this purpose the knuckles 8 of the upper and lower sections of the drag body are alined in end to end relation to receive said pins 9 and 9' and between the sections and adjacent the open ends of the drag body are spaced parallel arms 10—10 of a pair of brackets designated at 11, the outer ends of the arms being provided with alined openings 12—12 (Figure 7) for receiving a transverse pin 13. The brackets 11 are of substantially U formation as shown in Figure 2 of the drawings and the bight portion of each bracket or hanger is situated inside of the drag body 5 and provided with vertically spaced, aligned hinge eyes 15 having a vertical hinge pin 16 positioned therein and on which is pivotally mounted a bellcrank mounting for yoke 17 having a hollow or solid disk 18 journaled for spinning rotation on a pin 19 at the intermediate angular portion of the mounting. To the other end of the said mounting 17 is attached a coiled return and cushioning spring 20 by means of a connector 21, said spring having its rear end attached to the inside of said drag body 5.

The disks 18 serve as levelling and buffer devices and normally project outwardly at opposite transverse open ends of the drag body, the springs 20 yieldably maintaining the disks in their outwardly projected positions.

Also attached to the connectors 21 of each disk 18 is one end of a cable 22 extending forwardly through the hollow body, where it is trained over pulleys 23 mounted in the drag body (Figure 2) and then extends outwardly through the front edge of said body and thence up and rearwardly over the top of the drag body for attaching to a link 24 carried by a bracket 25 on a rear roller lifting and lowering truck or trailer unit 26.

The trailer truck 26 comprises a U-frame having angular arms 27 pivoted on the rear pin 8 and journaled on said frame are heavy cylindrical rollers 28 adapted to follow behind the drag body 5 to crush the clods and roll and smooth the resulting surface.

A pair of upstanding longitudinally extending flanges 29 are secured to the upper plate or section of the drag body, said flanges having forwardly inclined notches 30 and 31 therein adapted to selectively receive the angular ends 32 of a U-shaped prop 33 journaled in the bracket 25, said prop having a centrally arranged actuating lever 34 arising therefrom. By inserting the ends 32 of the prop in the rear notch 30, the rollers 28 will be lowered to a position below the plane of the drag body to thus support the rear end of the drag body in a ground clearing elevated position for traveling over highways, or when it is desired to independently roll the ground.

When the truck 26 and link 24 are bodily swung and moved rearwardly by the lowering of the rollers 28, the aforementioned then projecting disks 18 will be pulled and drawn inwardly of the open ends of the drag body into retracted positions by the endwise and tautening strain of said cable means 22.

A front truck or frame 35 includes angular arms 36 pivoted on the front pin 9' and on which an axle 37 is journaled for a pair of front lifting and drag transporting wheels 38, the latter being vertically disposed, as shown.

The truck or mounting frame 35 is essentially of U-shaped form and has a handle 39 rising therefrom and to which is pivotally attached an L-shaped handle equipped prop 40 adapted for engagement in a notch 41 of an upstanding flange 42 secured to the top plate of the drag body to latch and secure the front wheels 38 in an elevated position.

The front wheels 38 are provided with removable broad tread section 43 for use in traveling over highways and which may be removed to enable the wheels proper to penetrate and dig into the loose soil to prevent side slippage of the drag body when in use on steep hillsides.

A pair of smaller advance disks 44 and 45, preferably with solid rubber tires 46, are journaled on vertical pins 47 and 48 at the front ends of suitable mountings 49 and 50 which have spaced parallel arms 51 fastened rigidly on the pin 9'.

Clevises 52 and 53 are pivoted on the pins 47 and 48, respectively, and to which a tow iron 54 is attached for connecting the drag body to a tractor or other towing device (not shown).

From the foregoing it will be apparent that the drag body or sled-like housing 5 may be drawn over as a dead weight the surface of the soil to break up clods and uneven portions of the soil and thus smooth down the surface traversed.

The outwardly projecting disks 18 likewise will smooth the soil at said ends of the drag body so that the drag body may be worked closely under fruit trees, vines and the like, the disks 18 being self-yieldable to impact with the trees to prevent injury thereto.

The smaller front disks or wheels 44 and 45 serve to guide and steer the drag body away from the trees when drawn into contact therewith.

Attention is directed to the fact that the structure herein shown and described also appears, in the main, in U. S. Patent 2,325,875, granted to me under date of August 3, 1943. Said patent, also a land leveler, comprises, briefly recited, a sled-like, rectangular, substantially flat and hollow drag body which is open at transverse ends and made up of a pair of duplicate, upper and lower plate sections, there being means attached to the body for pulling the same over the surface of the ground and there being hollow, disk-like members mounted on bell crank fixtures within the end portions of the body, the same having springs associated therewith and said disk-like members also functioning as soil levelling and bumper devices, edge portions being normally projected, and the arrangement being such that said members may be retracted.

In the structure herein shown and described will be seen an arrangement also characterized by the elongated, rectangular drag body including flat top and bottom sections, said body being hollow and open at opposite transverse end portions, land conditioning and buffer disks located in said body adjacent the open ends thereof and having limited portions projecting beyond said open ends, means swingably mounting said disks in said body for projectable and retractable functioning, spring means in said body cooperable with said disks, other disks fixedly mounted for rotation on the leading edge of said drag body and located adjacent the opposite transverse ends of the body and provided with cushioning tires, said disks serving as guiding and steering elements and operating in advance of the first-named disks as the body is dragged along over the surface, a body lifting and lowering truck hingedly mounted on the leading edge portion of said drag body, ground contacting and transporting wheels mounted on said truck and located inwardly of the second-named disks, a trailing truck embodying a frame hingedly mounted on the rear trailing edge portion of said drag body and including relatively heavy soil impacting and smoothing rollers, and latching and stay means between the trucks and drag body to permit said trucks to be raised and held in elevated positions, or lowered and held in lowered positions in order to bring the wheels and rollers in contact with the ground and to lift the drag body clear of the ground.

One improvement has to do with the front wheel-like devices 44 and 45, these being described as rubber tire equipped disks and horizontally mounted on the leading edge portion of the body and being so located as to function primarily as guiding, steering and buffer wheels.

Another feature of the invention has to do with the cable means 22 and the pulleys and other features which make it possible to exert stresses upon the bell-crank yokes 17 for purposes of automatically retracting the disks 18 when the trailer truck, the means 26 at the rear, is swung down. Also, the idea of having the front and rear trucks on corresponding end portions of the drag body is believed to be new. It follows that my claims are, therefore, directed to these obvious improvements, that is, improvements based on the previous patent referred to.

It is believed that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

What is claimed is:

1. A sled-type clod breaking and surface smoothing land leveler of the class described comprising a drag body having flattened top and bottom sections, normally protruding soil levelling and buffer disks mounted in and projecting beyond opposite end portions of said drag body, together with advance guiding and steering disks, the latter rigidly mounted for rotation on the forward leading edge portion of said drag body, said last-named steering disks being marginally cushioned and serving as auxiliary buffers when drawn into contact with trees and other obstructions.

2. A land leveler for use in orchards, vineyards, and the like, comprising a sled-type drag body, said body being a hollow housing, rectangular in top plan and including flat top and bottom sections, said body being open at opposite transverse end portions, earth smoothing disks horizontally mounted in said end portions and having limited peripheral portions projecting normally outward and beyond said open ends, means operatively mounting said disks within the interior of said drag body including buffer springs and bell-crank members, disk mountings fastened to the leading edge of said drag body at points adjacent the open ends of the body, horizontal disks mounted for rotation in said mountings, said disks having treads in the form of rubber tires, said rubber tired disks serving as guides and as steering members and also as buffers.

3. The structure specified in claim 2, together with clevises attached to said mountings, and a draft iron connected to said clevises, said draft iron being adapted for connection with a tractor or the like.

4. A land leveler for use in orchards, vineyards and the like comprising a drag body, said body being rectangular in plan view and elongated, being hollow and including flat top and bottom sections and the ends of said body being open, mountings secured to the end portions of the leading edge of said body, there being two such mountings and said mountings being located adjacent the open ends of said body, horizontal disks mounted for free rotation on pivots in said mountings, said disks having rubber tires surrounding their tread portion and said rubber tired disks constituting advance guide and steering members as well as buffers, a draft iron for connection with the tractor and means for connecting said draft iron with said mountings, brackets mounted on the interior of said body adjacent the open ends of the body, bell crank yokes hingedly connected to said brackets and located and movable primarily within the confines of the end portions of the body, horizontal disks mounted for rotation in said bell-crank yokes, portions of said disks being located within the body and other portions projecting normally thru the open ends of the body, and spring means anchored within the interior of the body and connected with adjacent ends of said bell-crank yokes.

5. A land leveler for use in orchards, vineyards and the like comprising a drag body, said body being rectangular in plan view and elongated, being hollow and including flat top and bottom sections and the ends of said body being open, mountings secured to the end portions of the leading edge of said body, there being two such mountings, and said mountings being located adjacent the open ends of said body, horizontal disks mounted for free rotation on pivots in said mountings, said disks each having a rubber tire surrounding its tread portion and said rubber tired disks constituting advance guide and steering members as well as buffers, a draft iron for connection with the tractor and means for connecting said draft iron with said mountings, brackets mounted on the interior of said body adjacent the open ends of the body, bell-crank yokes hingedly connected to said brackets and located and movable primarily within the confines of the end portions of the body, horizontal disks mounted for rotation in said bell-crank yokes, portions of said disks being located within the body and other portions projecting normally on the open ends of the body, and spring means anchored within the interior of the body and connected with adjacent ends of said bell-crank yokes, together with cables connected to said bell-crank yokes, and pulley means on said body, said cables being trained over the pulley means and when pulled upon in predetermined directions serving to swing the bell-cranks and to retract the horizontal disks completely within the end portions of the body, in the manner and for the purposes described.

6. A land leveler for use in orchards, vineyards and the like comprising a substantially heavy sled-type drag body, said body being of elongated rectangular form in general outline, provided with resilient buffer means associated with external marginal edge portions, and being provided with means for connection with a tractor or the like, a truck embodying a trailing frame swingably mounted on the rear portion of said drag body, substantially heavy surface impacting rollers mounted for rotation in said frame and movable, through the medium of the frame, to a plane below the drag body to permit the rollers to serve for transporting purposes as well as land rolling purposes, and a similar truck frame pivotally mounted on the leading edge portion of said drag body, said last-named frame being provided with ground contacting and transporting rollers, said frames having manually adjusted lifting and lowering members.

7. A land leveler for use in orchards, vineyards and the like comprising a substantially heavy sled-type drag body, said body being of elongated rectangular form in general outline, provided with resilient buffer means associated with external marginal edge portions, and being provided with means for connection with a tractor or the like, a truck embodying a trailing frame swingably mounted on the rear portion of said drag body, substantially heavy surface impacting rollers mounted for rotation in said frame and movable, through the medium of the frame, to a plane below the drag body to permit the rollers to serve for transporting purposes as well as land rolling purposes, and a similar truck frame pivotally mounted on the leading edge portion of said drag body, said last-named frame being provided with ground contacting and transporting rollers, said frames having manually adjusted lifting and lowering members, and said members being provided with retaining props, said props serving to retain the frames, respectively, in elevated and lowered positions in relation to the drag body, and keeper means on the drag body with which said props releasably connect.

8. A land leveler for orchards and the like comprising an elongated rectangular drag body including flat top and bottom sections, said body being hollow and open at opposite transverse end portions, land conditioning and buffer disks located in said body adjacent the open ends thereof and having limited portions projecting beyond said open ends, means swingably mounting said disks in said body for projectable and retractable functioning, spring means in said body cooperable with said disks, other disks fixedly mounted for rotation on the leading edge of said drag body and located adjacent the opposite transverse ends of the body and provided with cushioning tires, said disks serving as guiding and steering elements and operating in advance of the first-named disks as the body is dragged along over the surface, a body lifting and lowering truck hingedly mounted on the leading edge portion of said drag body, ground contacting and transporting wheels mounted on said truck and located inwardly of the second-named disks, a trailing truck embodying a frame hingedly mounted on the rear trailing edge portion of said drag body and including relatively heavy soil impacting and smoothing rollers, and means between the trucks and drag body to permit said trucks to be raised and held in elevated position, or lowered and held in lowered positions in order to bring the wheels and rollers in contact with the ground and to lift the drag body clear of the ground.

LOUIS OSWALD.

REFERENCES CITED

The following references are of record in the file of this patent:

UNITED STATES PATENTS

| Number | Name | Date |
| --- | --- | --- |
| 2,325,875 | Oswald | Aug. 3, 1943 |